United States Patent [19]

Kuznetsov

[11] Patent Number: 4,489,265
[45] Date of Patent: Dec. 18, 1984

[54] ELECTRIC MACHINE WITH CONTINUOUS POLE PHASE MODULATION

[75] Inventor: Stephen B. Kuznetsov, Pittsburgh, Pa.

[73] Assignee: Westinghouse Electric Corp., Pittsburgh, Pa.

[21] Appl. No.: 478,564

[22] Filed: Mar. 24, 1983

[51] Int. Cl.³ .............................................. H02P 7/48
[52] U.S. Cl. ..................................................... 318/773
[58] Field of Search ............................... 318/773–777; 323/207, 210; 363/150

[56] References Cited

U.S. PATENT DOCUMENTS 4,152,630  5/1979  Wanlass ............................ 318/729
4,338,557  7/1982  Wanlass ............................ 318/729

OTHER PUBLICATIONS

Rawcliffe, G. H., "Induction Motors Old and New", *Electronics & Power*, Jul. 1979, pp. 502–507.

*Primary Examiner*—David Smith, Jr.
*Attorney, Agent, or Firm*—R. P. Lenart

[57] ABSTRACT

A pole phase modulated rotary electric machine is provided with a uniformly slotted stator structure and a main stator winding which spans the entire stator periphery. A control stator winding is wound in selected slots of the stator structure and the average phase change between adjacent slots of the stator structure is controlled by controlling the phase angle of current supplied to the control winding using a rotary magnetic induction phase shifter, an isolated variable reactance load, or a switching arrangement which varies the current amplitude and magnetic field axis of the controlled winding. Pole phase modulation provides a continuously variable magnetic speed control of induction type electrical machines operating at a fixed power frequency.

12 Claims, 9 Drawing Figures

ELECTRIC MACHINE WITH CONTINUOUS POLE PHASE MODULATION

BACKGROUND OF THE INVENTION

This invention relates to rotary electric machines and more particularly to such machines which include a two component stator winding where variation in speed is controlled by varying the phase change of currents flowing in adjacent slots of a stator assembly.

Speed control of rotary electric machines through pole phase modulation is based on the fact that it is possible to superimpose a second magnetomotive force (MMF) pattern on a primary magnetomotive force distribution at a variable phase displacement to control the number of effective poles formed by current flow in a two component stator winding. In most respects, a polyphase induction machine may be regarded as a linear system for superimposing magnetomotive force distributions. For a particular case wherein the primary MMF is subjected to 180° phase modulation or 0° phase modulation, for example, by reversing one-half of a stator winding with respect to the other half, two distinct synchronous speeds are established. Machines which exhibit this type of modulation are commonly referred to as being pole amplitude modulated.

Machines in which the speed is varied by varying the phase difference between the total effective current flowing in stator winding conductors of adjacent slots are disclosed in U.S. Pat. No. 3,040,226, issued June 19, 1962 to F. C. Williams et al. The machines described in that patent exhibit continuous variation in speed which is obtained by effectively varying the number of poles generated by the stator or primary winding. This is effected by feeding current from the mains and current from at least one phase shifting device in suitable proportions to the conductors in the slots of a discontinuous primary winding, thereby effectively stretching the poles when the phase shifting device is adjusted in one direction relative to the mains current and shrinking the poles when the phase shifting device is adjusted in the other direction relative to the mains current.

A pole phase modulated machine which exhibits a number of discrete speeds within a desired range is disclosed in U.S. Pat. No. 3,161,814, issued Dec. 15, 1964 to F. C. Williams et al. That patent discloses an alternating current machine having a stator winding consisting of a slotted structure provided with a plurality of sets of coils which are so arranged that the magnetomotive force in at least some of the slots is generated by the addition of magnetomotive forces caused by current flow in the conductors of at least two sets of coils and each set of coils is so arranged that the magnitude of current flow in the conductors of the slots due to the coils of one set is a single valued function of the distance along the arc of the slotted structure occupied by the one set of coils. Switching arrangements are provided for altering the connections between coils of the different sets to enable different predetermined values of average phase difference between the currents in adjacent slots to be obtained. Both of the Williams et al patents disclose discontinuous stator winding machines. Such machines utilize arc stators which result in a reduction in power to weight ratio and are difficult to manufacture. The present invention includes a stator winding which utilizes the entire periphery for speed control applications without the necessity for large dead zones which appear in arc stator machines.

SUMMARY OF THE INVENTION

This invention provides an alternative approach to variable speed motor drives through the use of a cage rotor induction machine which has a continuously variable stator magnetomotive force pattern with, consequently, a continuously adjustable synchronous field speed. Machines constructed in accordance with this invention include a conventional cage rotor secondary and a conventionally slotted, uniform pitch stator primary but differ from standard single-speed motors in that the number of turns per coil, peripheral current loading and phase change per slot are not uniform along the periphery. In its most basic form, the machine comprises two distinct stator windings, a high power main winding and a medium power control winding. For manufacturing convenience, these two windings may be placed in series to constitute a single winding, operated directly on a constant frequency, sinusoidally varying power source. The machine is regenerative and retains the basic stiffness of torque versus slip as in all large polyphase induction machines. A rotary electric machine constructed in accordance with the present invention comprises: a stator structure having a plurality of uniformly distributed axial slots disposed adjacent to the periphery of a generally cylindrical opening within the stator structure; a main stator winding including a plurality of coils having at least one conductor disposed within each of said slots; a control stator winding including a plurality of coils having at least one conductor disposed within selected ones of said slots; and means for varying the phase of current flow in the control stator winding with reference to current flow in the main stator winding, thereby varying the effective number of poles formed by current flowing through the main and control stator windings. The phase varying means may include a rotary magnetic-induction phase shifter, such as a power selsyn, connected between the main and control windings to directly excite the control winding at a variable phase, or alternatively, the control winding may be connected to an isolated electrical load of variable reactance to adjust the phase of current flowing in the control stator winding. In each case, it is understood that the mechanism of control is non-dissipative of electric power with the exception of a small additional resistive loss of the control winding, since the current controlled is reactive current.

This invention also encompasses machines wherein the phase difference between adjacent slots of the stator structure is adjusted by controlling the amplitude of current excitation flowing in the control stator winding by using controlled switching devices. Alternatively, for a polyphase machine application, the magnetic axis of the control stator winding can be shifted between two power source phases through the use of controlled switching devices connected to one end of the control stator winding on a per phase basis.

DESCRIPTION OF THE PREFERRED EMBODIMENTS

Figure 1:
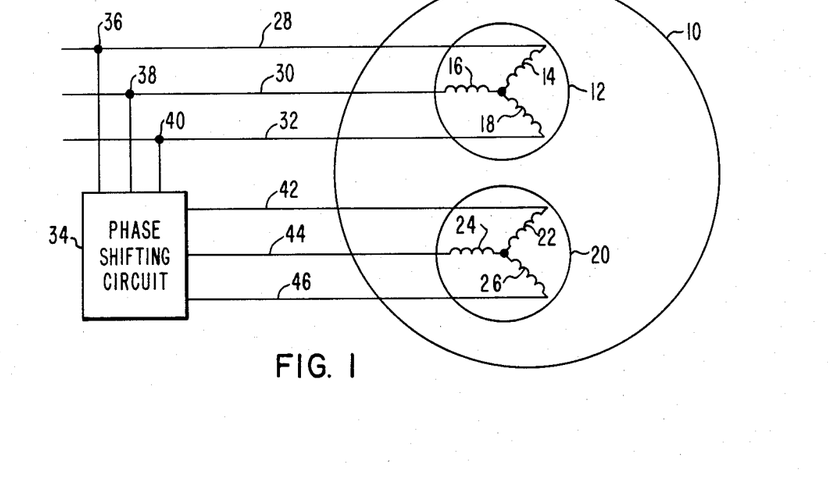
FIG. 1 is a schematic diagram of an electric motor system constructed in accordance with one embodiment of the present invention.

Referring to the drawings, FIG. 1 is a schematic diagram of an electric machine system constructed in accordance with one embodiment of this invention. The machine includes a conventional stator structure 10 having a plurality of uniformly distributed axial slots disposed adjacent to the periphery of a generally cylindrical opening within the stator structure. Two stator windings are shown. The first stator winding is a main stator winding 12 which includes a plurality of coils 14, 16 and 18 having at least one conductor disposed within each of the slots of stator structure 10. The second winding is a control stator winding 20 including a plurality of coils 22, 24 and 26 having at least one conductor disposed within selected ones of the slots of the stator structure 10. The main stator winding 12 receives power from an external power source, not shown, by way of lines 28, 30 and 32. Phase shifting circuit 34 is connected to lines 28, 30 and 32 at points 36, 38 and 40, respectively. Phase shifting circuit 34, which may be a rotary magnetic-induction phase shifter such as a power selsyn, serves as means for shifting the current supplied to control stator winding 20 by way of lines 42, 44 and 46.

Figure 2:
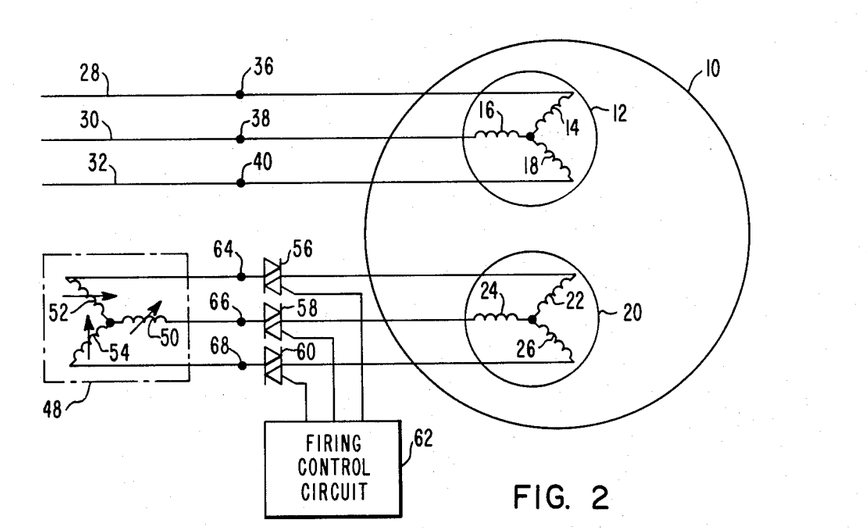
FIG. 2 is a schematic diagram of an electric motor system constructed in accordance with an alternative embodiment of the present invention.

FIG. 2 is a schematic diagram of an alternative electric machine system constructed in accordance with this invention. In this embodiment, an isolated variable reactance load 48 comprising adjustable reactance coils 50, 52 and 54, is connected to control stator winding 20 through switching devices 56, 58 and 60. Firing control circuit 62 is used to control the operation of switching devices 56, 58 and 60. It should be understood that in an alternative embodiment, variable reactance load 48 may be connected directly to control stator winding 20 without the use of switching devices. In that arrangement, the phase of current induced in control stator winding 20 would be adjusted by adjusting the reactance of the individual coils within the variable reactance load 48. In another alternative embodiment of this invention, variable reactance load 48 may be disconnected at points 64, 66 and 68, and these points may be connected directly to points 36, 38 and 40, respectively, on power supply lines 28, 30 and 32. With this connection, switching thyristors 56, 58 and 60 can be used to control the amplitude of current flowing through control stator winding 20. Amplitude control can be used to vary the average phase angle difference between adjacent slots of a stator structure which include conductors of both main stator winding 12 and control stator winding 20.

Figure 3:
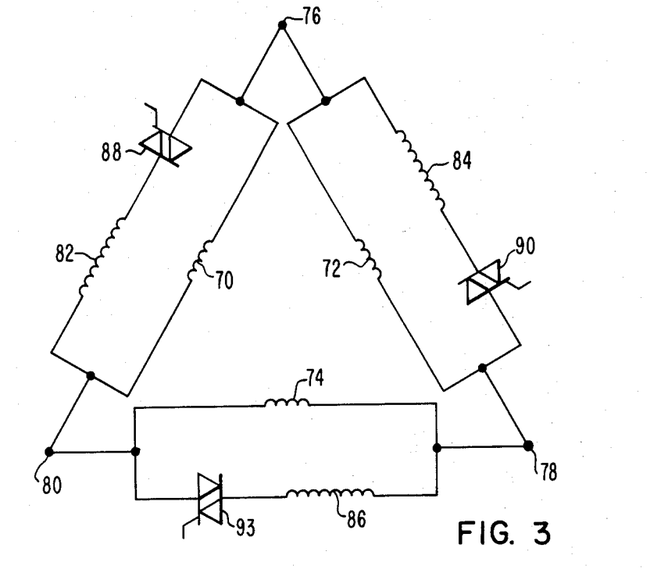
FIG. 3 is a schematic diagram of the stator circuit of a machine constructed in accordance with one embodiment of this invention which utilizes amplitude control of the control stator winding.

FIG. 3 is a schematic diagram of an alternative embodiment of the stator circuit of a machine constructed in accordance with this invention which utilizes amplitude control of the control stator winding. This embodiment retains the conventional stator structure having a plurality of uniformly distributed axial slots disposed adjacent to the periphery of a generally cylindrical opening within the stator structure, and includes a main stator winding comprising coils 70, 72 and 74 which are connected in a delta configuration between terminals 76, 78 and 80. The main stator winding coils are wound to have at least one conductor disposed within each of the slots of the stator structure. A control stator winding comprising coils 82, 84 and 86 is also connected in a delta configuration between terminals 76, 78 and 80 and wound to have at least one conductor disposed within selected slots of the stator structure. Thyristors 88, 90 and 93 are connected within each leg of the control stator winding delta circuit to provide amplitude control of current through the control stator winding coils and serve as means for varying the phase change per slot of current flowing in the stator slots which contain conductors of both the control and main windings. This thereby varies the effective number of poles formed by the composite current flowing through the main and control stator windings. A firing control circuit, as shown in FIG. 2, is used to control the operation of thyristors 88, 90 and 93.

Figure 4:
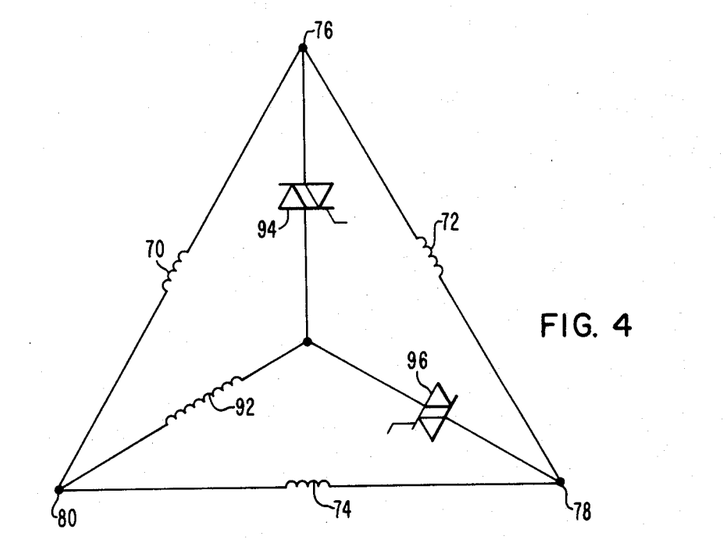
FIG. 4 is a schematic diagram of the stator circuit of an alternaive embodiment of this invention which utilizes magnetic axis shifting of a control stator winding for one primary phase.

FIG. 4 is a schematic diagram of an alternative stator circuit which varies the magnetic axis of the control stator winding to achieve variation in the phase of the composite MMF for the main and control stator windings. In this embodiment, the main control stator winding comprising coils 70, 72 and 74 is wound and connected as in FIG. 3. Control stator winding 92 is wound to have at least one conductor disposed within selected slots of the stator structure and is permanently connected at one end to one of the terminals, 80. The other end of control stator winding 92 is connected through switching devices 94 and 96 to terminals 76 and 78, respectively. Thyristors 94 and 96 are alternatively caused to conduct at various angles and without overlap such that the magnetic axis of control stator winding 92 can be continually varied between terminals 76 and 78.

Figure 5:
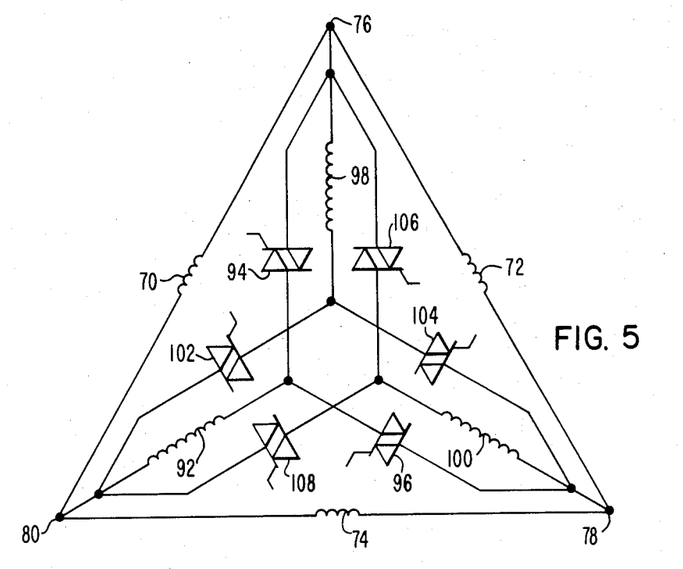
FIG. 5 is a schematic diagram of a stator circuit which includes three control stator winding coils connected for magnetic axis shifting.

FIG. 5 is a schematic diagram of the stator circuit of FIG. 4 with the addition of two coil groups 98 and 100 to the control stator winding. In this embodiment, thyristors 102 and 104 are used to vary the magnetic axis of coil group 98 between terminals 80 and 78, while thyristors 106 and 108 are used to vary the magnetic axis of coil group 100 between terminals 76 and 80.

Figure 6:
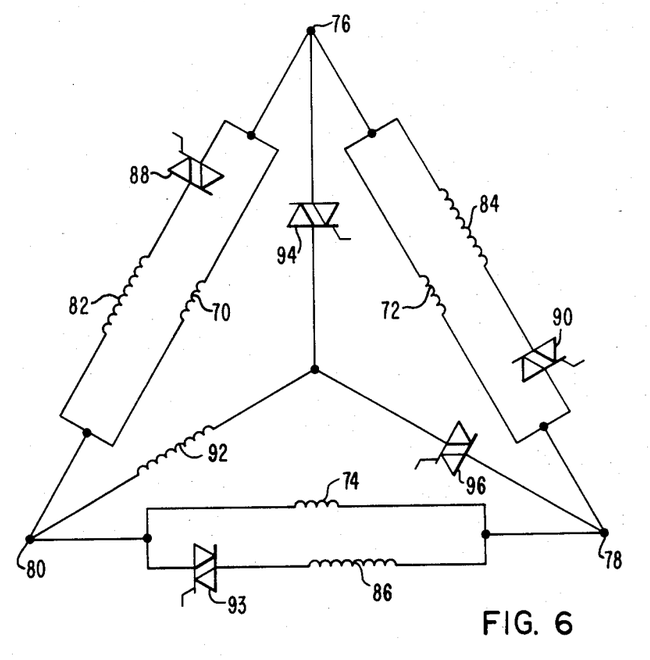
FIG. 6 is a schematic diagram of a stator circuit which combines the circuits of FIGS. 3 and 4.

FIG. 6 is a schematic diagram of a stator circuit formed by combining the stator circuits of FIGS. 3 and 4. This circuit combines the amplitude control of coils 82, 84 and 86, with the magnetic axis control of coil group 92.

Figure 7:
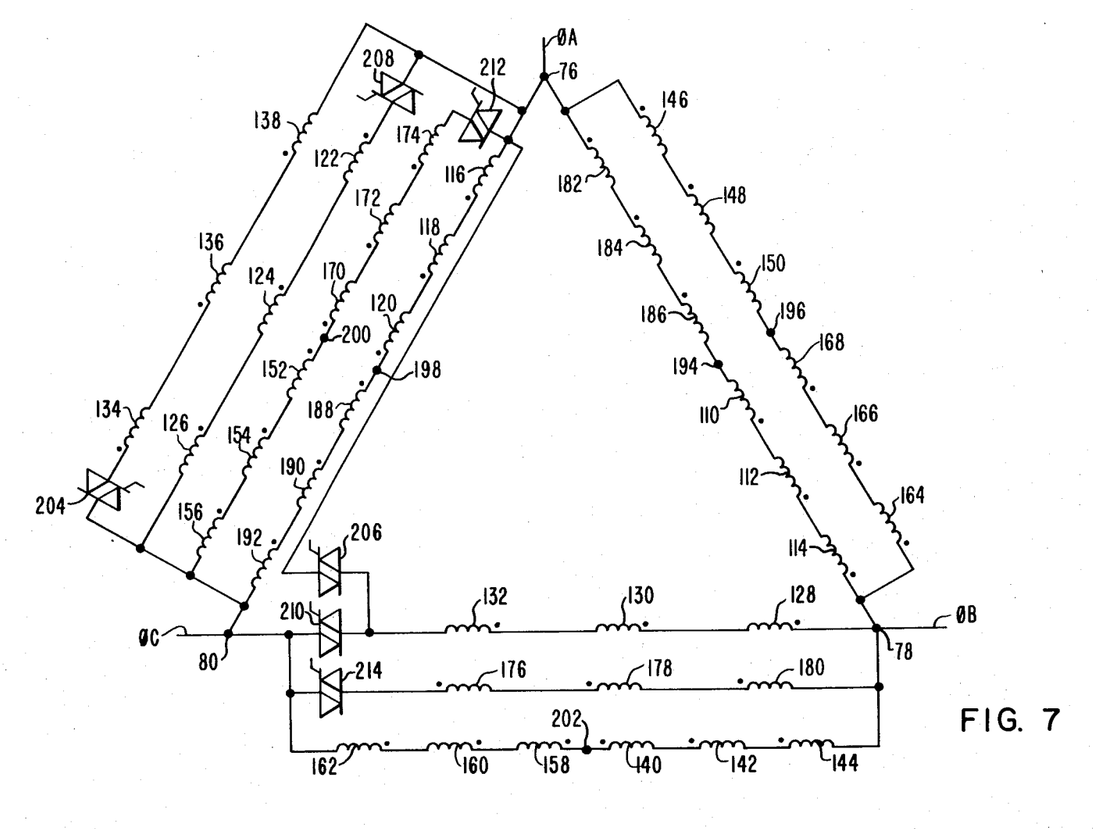
FIG. 7 is a schematic diagram of the stator circuit of an alternaitve embodiment of this invention.

FIG. 7 is a schematic diagram of a stator circuit for a 42 coil machine constructed in accordance with one embodiment of this invention. In this machine, the standard winding sequence between terminals 76 and 78 is: 128-130-132, 146-148-150, 164-166-168, 182-184-186, and 110-112-114. Between terminals 76 and 80, the standard sequence is: 116-118-120, 134-136-138, 152-154-156, 170-172-174, and 188-190-192. The standard sequence between terminals 78 and 80 is: 122-12-4-126, 140-142-144, 158-160-162, and 176-178-180. In this embodiment, coils 122, 124, 126, 128, 130, 132, 134, 136 and 138 have 2N relative turns. Coils 176, 178 and 180 have approximately 2N relative turns and the remaining coils have N relative turns. The coils are wound to provide floating midpoints at the points 194, 196, 198, 200 and 202, wherein a midpoint is defined as a connection point between two pole-windings per phase when series connected. The midpoint arrangement is a necessary configuration for the aforementioned five pole groups as it ensures equal current loading and current phase for all coils associated with a particular midpoint, and avoids circulating currents in otherwise parallel connected pole groups. Thyristors 204, 206, 208, 210, 212 and 214 are controlled by a firing circuit, not shown, and operated according to Table I to achieve speeds which vary from 600 to 900 rpm.

TABLE I

| Thyristor | High Speed | Medium Speed | Low Speed |
|---|---|---|---|
| 204 | ON | OFF | ON |
| 206 | ON | OFF | OFF |
| 208 | $\alpha = 80°$ | OFF | ON |
| 210 | OFF | OFF | ON |
| 212 | ON | ON | $\alpha = 60°$ |
| 214 | ON | ON | $\alpha = 60°$ |
| RPM | 900 | 720 | 600 |

In Table I, $\alpha$ denotes the delay in an electrical gating angle for a thyristor lagging behind the normal conduction angle of an ideal diode in the same circuit. The speeds listed in Table I represent a chording factor of 7/9 and a 60 Hz power supply.

Figure 8:
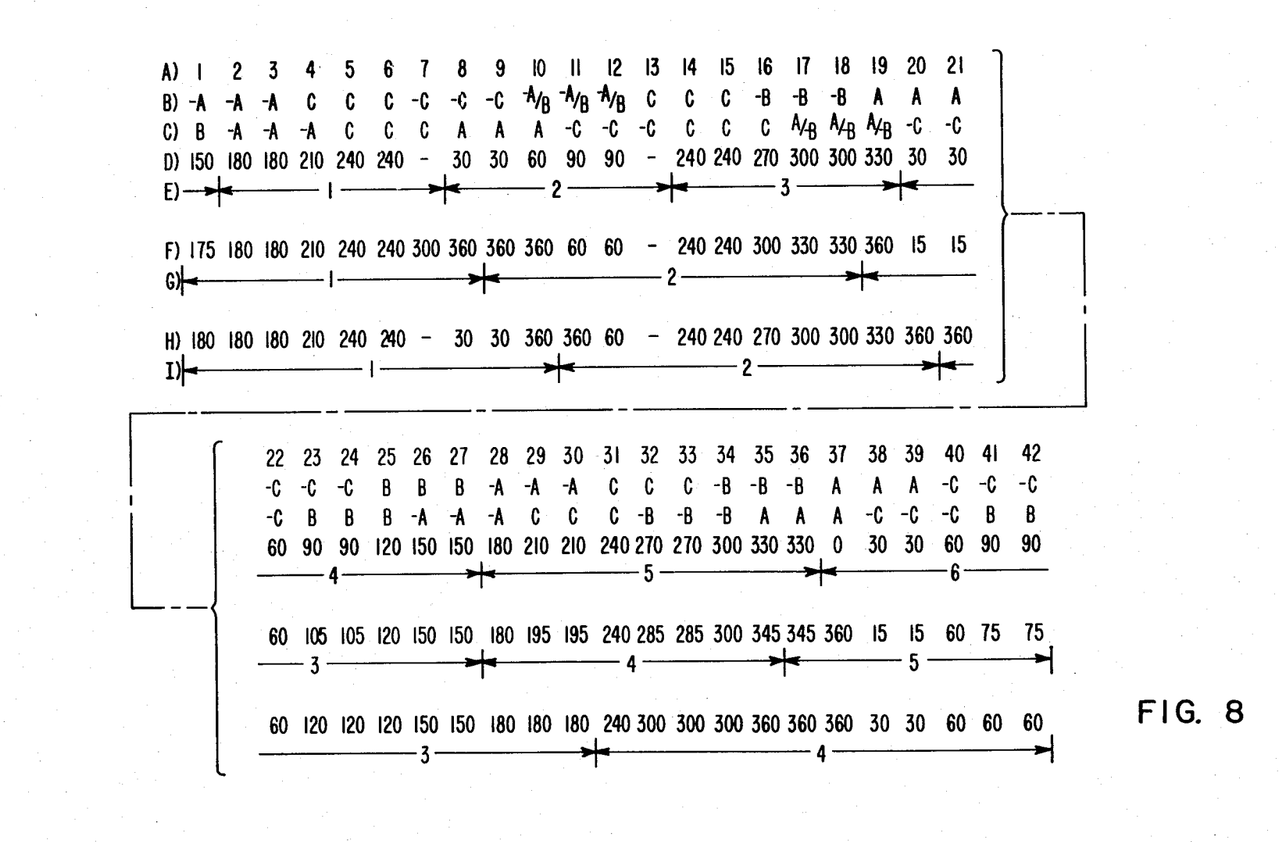
FIG. 8 is a chart showing the slot conductor loading of a particular machine constructed in accordance with one embodiment of this invention.

FIG. 8 is a chart showing the slot loading for the machine illustrated in FIG. 7. The coils of FIG. 7 are labeled, using even numbers, in the order in which they appear in the machine, with label numbers 110 through 192 corresponding to coils 1 through 42 respectively in FIG. 8. Line A in FIG. 8 is the slot number while lines B and C show the instantaneous phase polarities for the case when phase A is connected to terminal 76, phase B is connected to terminal 78 and phase C is connected to terminal 80. Line D shows the average phase angle per slot when thyristors 204 through 214 are operated in accordance with the low speed column of Table I. This results in the formation of the six magnetic poles shown in line E. Each magnetic pole represents a phase change of approximately 180°. When the thyristors are operated in accordance with the medium speed column of Table I, the average phase per slot shown in line F is generated and the five poles shown in line G are formed. For high speed operation, the phases per slot shown in line H are produced and the four poles of line I are formed.

Phase modulation at angles other than 0° or 180° is accomplished in the disclosed embodiments through the use of: a magnetic-induction phase shifter, an isolated variable inductance load, or a controlled switching arrangement. Since the integral of the magnetomotive force around the machine periphery must be equal to zero, and continuous pole phase modulation results in an MMF distribution which has positive and negative half cycles of unequal angular width, and the peak magnitudes of the positive and negative MMF are not equal. Therefore a particular segment of the stator winding may continuously operate at a higher temperature.

In the thyristor controlled arrangement, each thyristor only controls the rated coil current rather than the entire phase current characteristic of inverter drives. At high speed, the thyristors are either nearly at full conduction or completely off, thereby avoiding harmonic machine losses. At the medium speed, most of the thyristors are completely off. In addition, the thyristors are used in both phase-control and full-conduction integral duty cycle modes and are naturally commutated, thereby avoiding forced commutating circuitry.

Continuous speed control of machines in accordance with this invention is limited to one direction of rotor motion since a space-transient airgap magnetic field is set up with a requisite ramping of the flux density versus periphery angle. The series connection of at least two pole-groups within one repeatable section, as illustrated in FIG. 7, cannot be changed to parallel line-fed coils irrespective of line voltage or number of turns since the pole phase modulation angle must be current-forced in coils so connected. Since the phase balance of current is critical, certain coils may be required to have N+1 or 2N+1 relative turns according to the exact amount of rotor leakage inductance used.

Figure 9:
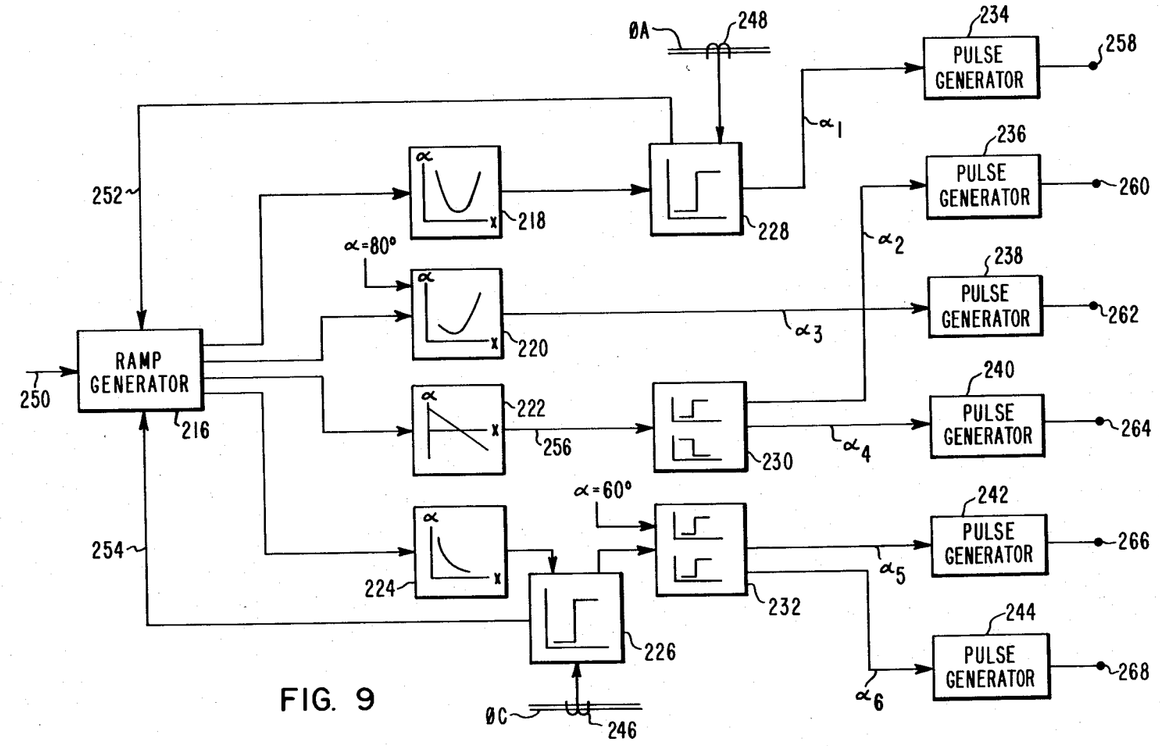
FIG. 9 is a block diagram of a thyristor firing control circuit for use with the machine of FIG. 7.

FIG. 9 is a block diagram of a thyristor firing control for use with the machine of FIG. 7, wherein thyristors 204, 206, 208, 210, 212 and 214 are controlled by signals appearing on terminals 258, 260, 262, 264, 266 and 268, respectively. A speed command signal, such as a DC voltage, from an operator is injected via line 250 to a ramp generator 216. This ramp generator modulates the command signal input with a ramp function to provide smooth-start gating signals. Two additional inputs to ramp generator 216 on lines 252 and 254 provide DC signals in direct proportion to the line currents of phases A and C respectively and serve to change the slope of voltage versus time of the ramp generator to limit line current.

Four output lines from ramp generator 216 are independently controlled to have identical outputs and are directly coupled to function generators 218, 220, 222 and 224. Unit 218 has a parabolic type of response having the form $\alpha = m(x-a)^2 + b$, where $\alpha$ represents the thyristor gating delay angle; x represents the DC input control voltage; an constants m, a and b are dependent on the output range of ramp generator 216. Unit 220 is a function generator with a characteristic response having the form $\alpha = m'(x-a')^2$, where $m' > m$ and $a' < a$ in comparison with unit 218, and $\alpha$ is limited to 80°. Unit 222 comprises a monotonically decreasing function generator with a response having the form $\alpha = mx + b$ with equal positive and negative areas of output voltage. The input is equal to 0.50 per unit at the crossover point. Unit 224 comprises a function generator with a characteristic inverse function having the form $\alpha = m/x$ such that the thyristor gating output signal is shut off at zero control input and approaches the 10° point or lower as the control input reaches the supply voltage input.

The outputs of function generators 218 and 224 directly feed through current transducers 228 and 226 respectively. These current transducers have preset limits whereby a current signal from transformers 246 of 248, which exceeds the preset limit, will cause the transducer output signal to approach 90°, with a time constant less than the power line cycle time, and shut off thyristors 204, 212 and 214. Unit 230 is a differential switching amplifier that directs the control signal on line 256 to thyristor 206, if negative, or to thyristor 210, if positive, with a finite dead band between switching modes equal to about twice the reverse recovery times, $t_{rr}$, of the thyristors.

Unit 232 is a dual output isolation amplifier with simultaneous output tracking and a preset gating angle limit of 60° for both output channels. Units 234, 236, 238, 240, 242 and 244 are identical in construction and each comprise a high current gate pulse generator and a final driver for thyristors 204, 206, 208, 210, 212 and 214, respectively. It is understood that all of the devices denoted as thyristors in this description are bilateral devices and have identical characteristics in both directions for the conduction of an alternating current.

While the present invention has been described in terms of what are believed to be the preferred embodiments, it will be apparent to those skilled in the art that various changes and modifications may be made to these embodiments without departing from the scope of this invention. For example, although three phase machines have been described, this invention also applies to other polyphase machines. It is therefore intended that the appended claims cover all such changes and modifications that fall within the scope of the invention.

What is claimed is:

1. A variable speed electric machine comprising:
   a stator structure having a plurality of uniformly distributed axial slots disposed adjacent to the periphery of a generally cylindrical opening within said stator structure;
   a main stator winding including a plurality of coils having at least one conductor disposed within each of said slots, said main stator winding being connected to a plurality of terminals for connection to an external power source;
   a control stator winding including a plurality of coils having at least one conductor disposed within selected ones of said slots;
   a plurality of switches, each connected between one coil of said control stator winding and one of said terminals for connection to said external power source;
   means for controlling the operation of said switches to alter the phase change of current flowing in adjacent slots of said stator structure, thereby changing the effective number of poles along the periphery of said generally cylindrical opening by varying the magnitude of current flowing in said control stator winding.

2. A variable speed electric machine comprising:
   a stator structure having a plurality of uniformly distributed axial slots disposed adjacent to the periphery of a generally cylindrical opening within said stator structure;
   a plurality of terminals for connection to an external power source;
   a main stator winding connected in a delta configuration between said terminals and including a plurality of coils having at least one conductor disposed in each of said slots;
   a control stator winding connected in a delta configuration between said terminals and including a plurality of coils having at least one conductor disposed within selected ones of said slots;
   means for varying the phase change between adjacent ones of said slots caused by current flowing in said control stator winding and said main stator winding, thereby varying the effective number of poles formed by current flowing through said main and control stator windings;
   a second control stator winding having a first end connected to one of said terminals;
   a first switch connected between a second end of said second control stator winding and a second one of said terminals; and
   a second switch connected between said second end of said second control stator winding and a third one of said terminals.

3. An electric machine as recited in claim 2, wherein said first and second switches are thyristors.

4. An electric machine as recited in claim 3, further comprising:
   means for controlling the operation of said thyristors.

5. A variable speed electric machine comprising:
   a stator structure having a plurality of uniformly distributed axial slots disposed adjacent to the periphery of a generally cylindrical opening within said stator structure;
   a plurality of terminals for connection to an external power source;
   a main stator winding connected in a delta configuration between said terminals and including a plurality of coils having at least one conductor disposed in each of said slots;
   a control stator winding having a first end connected to a first one of said terminals and wound to include at least one conductor within selected ones of said slots; and
   means for connecting a second end of said control stator winding alternatively to a second and third one of said terminals, thereby varying the phase difference between adjacent ones of said slots caused by currents in said main stator winding and said control stator winding in said slots having conductors of both said main and control stator windings.

6. An electric machine as recited in claim 5, wherein said means for connecting a second end of said control stator winding comprises:
   a first switch connected between said second end of said control stator winding and said second one of said terminals; and
   a second switch connected between said second end of said control stator winding and said third one of said terminals.

7. An electric machine as recited in claim 6, wherein said first and second switches are thyristors.

8. An electric machine as recited in claim 7, further comprising:
   means for controlling the operation of said thyristors.

9. An electric machine as recited in claim 5, further comprising:
   a second control stator winding having a first end connected to said second terminal and wound to include at least one conductor within selected ones of said slots; and
   means for connecting a second end of said second control stator winding alternatively to said first and third terminals, thereby varying the phase difference between adjacent ones of said slots caused by currents in said main stator winding and said second control stator winding in said slots having conductors of both said main and second control stator windings.

10. An electric machine as recited in claim 9, further comprising:
    a third control stator winding connected in a delta configuration between said terminals and including a plurality of coils having at least one conductor disposed within selected ones of said slots; and means for varying the phase of current flowing in said third control stator winding with reference to current flowing in said main stator winding, thereby varying the effective number of poles formed by current flowing through said main and third control stator windings.

11. An electric machine as recited in claim 9, further comprising:

a third control stator winding having a first end connected to said third terminal and wound to include at least one conductor within selected ones of said slots; and means for connecting a second end of said third control stator winding alternatively to said first and second terminals, thereby varying the phase difference between adjacent ones of said slots casued by currents in said main stator winding and said third control stator winding in said slots having conductors of both said main and third control stator windings.

12. An electric machine as recited in claim 11, further comprising:

a fourth control stator winding connected in a delta configuration between said terminals and including a plurality of coils having at least one conductor disposed within selected ones of said slots; and means for varying the phase of current flowing in said fourth control stator winding with reference to current flowing in said main stator winding, thereby varying the effective number of poles formed by current flowing through said main and fourth control stator windings.

* * * * *